May 27, 1930.  E. W. ACKERMAN ET AL  1,759,879
REBOUND DEVICE
Filed Oct. 19, 1927
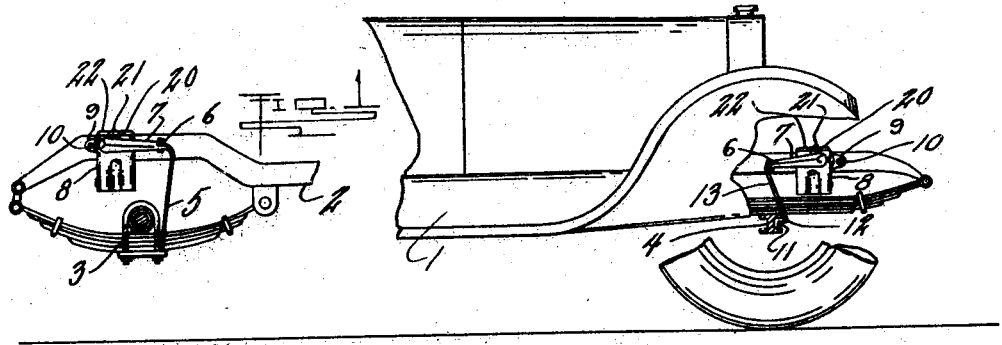
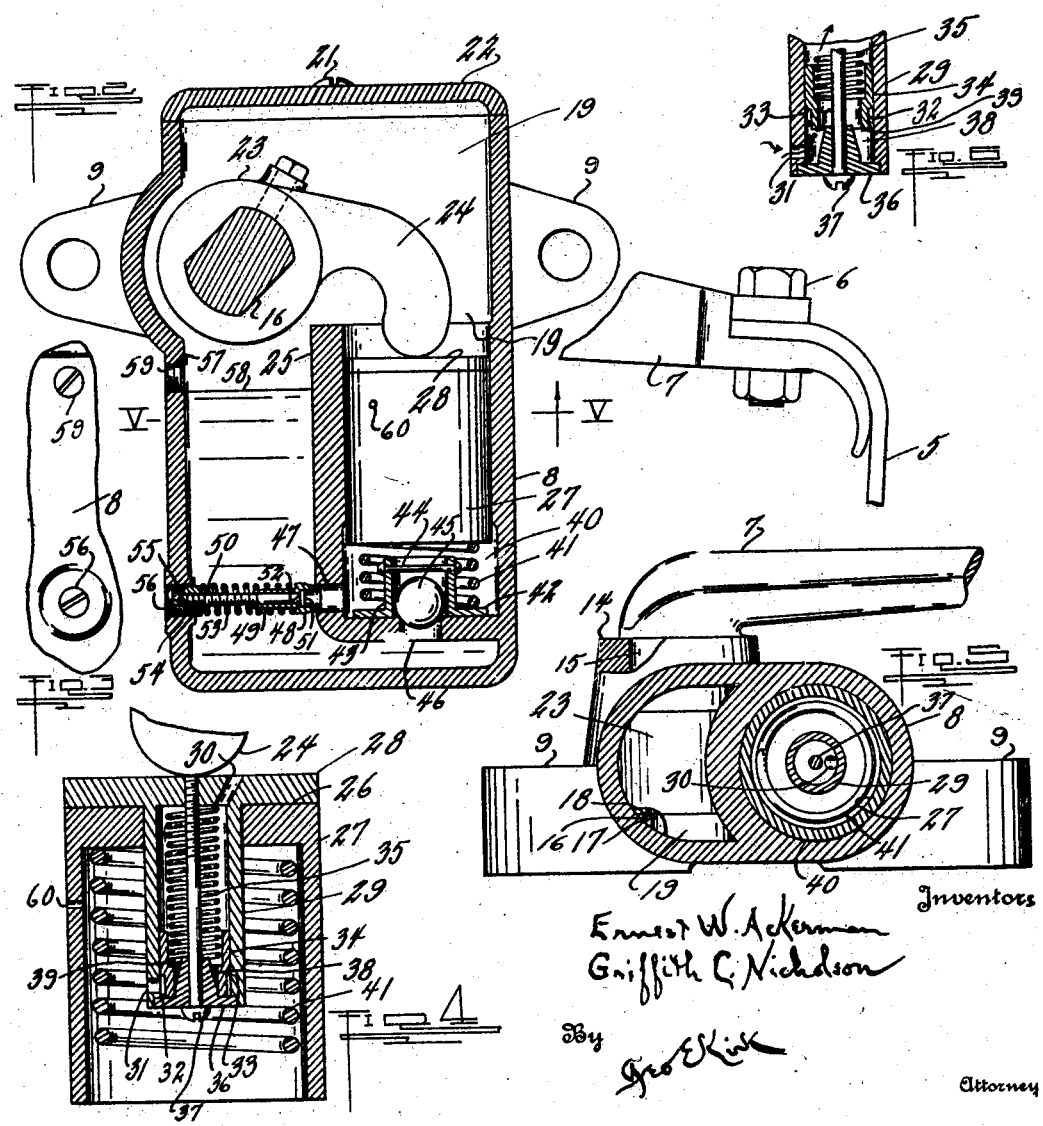
Inventors
Ernest W. Ackerman
Griffith C. Nicholson
By Geo E Kirk
Attorney Patented May 27, 1930

1,759,879

UNITED STATES PATENT OFFICE

ERNEST W. ACKERMAN AND GRIFFITH C. NICHOLSON, OF MONROE, MICHIGAN, ASSIGNORS TO THE HYDRO-CHECK CORPORATION, OF MONROE, MICHIGAN, A CORPORATION OF MICHIGAN

REBOUND DEVICE

Application filed October 19, 1927. Serial No. 227,147.

This invention relates to automatic relief mechanism in fluid devices.

This invention has utility when incorporated in rebound take-up devices of the hydraulic type coacting as so-called shock absorbers in motor vehicles when assembled between the chassis and carrying axles thereof.

Referring to the drawings:

Fig 1 is a side elevation, with parts broken away, showing embodiments of the invention as assembled on a motor vehicle;

Fig. 2 is an enlarged view in vertical section of one of the devices of Fig. 1, parts being broken away;

Fig. 3 is a fragmentary side elevation from the left of the vessel of Fig. 2;

Fig. 4 is a vertical section through the piston of the device of Fig. 2;

Fig. 5 is a section on the line V—V Fig. 2, looking in the direction of the arrow; and Fig. 6 is a detail view of the relief valve in the piston showing, in section as shifted to open position.

Motor vehicle 1 is shown as having chassis 2, rear axle 3 and forward axle 4. From the rear axle 3 is shown flexible band or strap 5 having connection 6 with rigid arm 7 as protruding from vessel 8 provided with ears 9 through which bolts 10 extend for anchoring this vessel 8 fixed with the chassis 2.

Bolt 11 at the front axle 4 has connection 12 to flexible strap 13 and connection 6 with arm 7 extending to vessel 8 fixed with the chassis 2 in proximity to the forward axle 4 in oppositely directed assembly from the mounting of the device at the rear axle 3.

The vessel 8 is provided with boss 14 through which extends trunnion 15 integral with the arm 7. This trunnion 15 has intermediate key portion 16 which terminates in reduced portion 17 extending into boss 18 in chamber 19 of the vessel 8. This vessel 8 adjacent its upper portion is provided with bosses 20 into which screws 21 extend for mounting top closure 22 in assembled position therewith. Mounted on the key portion 16 of this trunnion which is integral with the arm 7, is hub portion 23 of cam arm or finger 24. In this vessel 8 is wall 25 forming with the vessel 8 a cylinder. In this cylinder is disposed piston having head 26 and depending skirt 27. This piston has an auxiliary head 28 assembled fixedly therewith in carrying tubular extension 29 extending concentrically of the skirt 27. This piston head 28 and tubular extension 29, having press fit with the piston 26, 27, provide a relief valve having port 30. This tubular extension 29 has in the lower portion thereof lateral opening 31 to annular port 32 under annular shoulder 33 of ring 34 acted upon by helical compression spring 35 thrusting this ring 34 against washer or head 36 rigidly mounted fixed with the tubular extension 29 by screw 37 anchored in the auxiliary piston head 28. This washer 36 has projection 38 concentrically of the ring 34 in this tubular member 29. This projection provides an inner seat for a portion of the ring 34 and as the ring 34 rises, this ring clears this seat to beveled region 39 so that in the operation of this device as a relief valve when pressure is built up in cylinder member 40 with transmission of such pressure through opening 31 into port 32, the action of such pressure on the shoulder 33 may tend to lift the ring 34 against the resistance of the spring 35. As the lower edge of the ring is thus exposed for pressure action, further lifting of the ring 34 readily occurs and the lifting of this ring above the projection 38, as an inner bearing, continues to the bevel region 39 where there is a self-cleaning or clearing discharge in the flow of the relief fluid into the tubular extension 29 for discharge by way of the port 30 into the vessel chamber 19.

The piston 26, 27, is thrust toward the cam finger 24 by compression spring 41 in the cylinder 40. This spring 41 seats on flange 42 having upstanding central tubular extension 43 carrying pin 44 in providing cage for intake check valve ball 45 thereby retained in position at port 46 in the bottom of the cylinder 25.

In proximity to the lower portion of the cylinder 25, there is port 47 toward which is positioned ring 48 having sleeve extension 49 about threaded stem 50 having head 51 against which inner ledge 52 of this ring 48 is thrust by helical compression spring 53 about the stem 50. This threaded stem 50 is engaged by bushing device at opening 54 in the vessel 8. The extent of this stem 50 is to a countersunk-position in this wall of the vessel 8.

In practice, this terminus of the stem 50 may be covered with packing 55 say as graphite impregnated asbestos so that as stub screw closure 56 is assembled flush in this port 54, the packing 55 is a seal against leakage as well as a concealing element against tampering with the adjustment for this ring 48. The wall of the vessel 8 below the upper portion of the cylinder 25 is provided with internally threaded port 57 to permit charging of this device with a liquid. There is thus established liquid level 58 herein below this port 57 after which threaded plug 59 may be inserted therein. This liquid 58 may be an oil tending to maintain fluidity approximately constant in the range of temperatures found in the latitude for the use of the vehicle. This liquid 58 as charged into the device below the top of the cylinder 25 leaves in this chamber 8 an upper air chamber above this liquid level. In setting the device, the arm 7 as to the strap 5 is pulled to a desired position of strain, which may be approximately horizontal or somewhat therebelow.

In vehicle operation resulting in oscillation of the arm 7, there is such thrusting of the piston 26, 27, 28, upwardly by the spring 41 in following the cam finger 24 that port 60 in the skirt 27 rises above the cylinder 25 and permits air intake into the skirted piston 27 as a pump replenishing supply to maintain an air cushion region thus readily compressible for accommodating slight oscillations of the arm 7 with the material resistance. In the upward movement of the arm 7 and cam finger 24 as well as the piston 26, 27, 28, there is increase in capacity of the cylinder chamber 40 with resultant opening of intake valve 45 and in-flow of liquid 58 at such chamber. Upon the recover travel of the arm 7, the valve 45 seats at once. Pressure is at first built up by acting upon the compressible air between the port 60 and the head 26 of the cylinder as in the region within the skirt 27. After this cushioning is taken up, the incompressible liquid is acted upon by the piston. This action is not rigid in the preferred embodiment of the device for the reason that the ring 48 is positioned for slight clearance as to the port 47 thereby allowing a seepage at this port 47 to permit shifting of the piston 26, 27, 28, by the cam finger 24 to reduce the capacity of the cylinder chamber 40.

The strength of the spring 53 may be such that this valve ring 48 will resist liquid escape here beyond the adjusted seepage until after the relief valve in the piston has acted.

The operation of this seepage valve 48 is such that in the event foreign matter might tend to lodge and obstruct the opening, this valve 48 will relieve such before strain approaching rupture of this device is developed. Upon this relief, the ring section about this valve makes this valve self-clearing or cleaning.

When in normal action there is present the relief valve in the piston as well as this relief valve in the cylinder, this piston relief valve may come into action as the compressible medium has its pressure built up and there is tendency to move the arm 7 beyond the seepage capacity of the port 47. This pressure building up in the cylinder chamber 40 as transmitted through opening 31 to the annular port 32, acts on the shoulder 33 to lift the ring 34 against the action of the spring 35. At once the ring 34 is lifted to greater area of exposure at the end beyond its shoulder 33, this increased pressure moves the ring quickly, and in this travel above the projection 38 as a central guide, the shifting of the ring to the region of the bevel portion 39, allows the rush of liquid 58 as under pressure through the opening 31 and below the ring 34 over this bevel 39 to flow by port 30 outward from above the cylinder 27 into the vessel chamber 19. As the transmitted pressure upon the cam finger 24 is reduced, the spring 35 at once seats this ring 34 to close the port about the projection 38. The flow action here has been one to avoid any accumulation of clogging material but to insure blowing thereof over the bevel portion 39 so that at all times the ring 34 may be snugly seated during the intervals of non-relief action.

In the event the flow demand be in excess of that provided in the relief valve of the piston, the spring 53 may allow the ring 48 to recede from the port 47 to supplement this relief through the piston. In some embodiments hereunder, the relief through the piston may be omitted entirely and the relief at the port 47 be effective upon shifting of the ring 48 as the relief so that this port 47 serves as both seepage and relief.

Again the adjustment of the spring 53 may be weaker than that of the spring 35 so that there may be primary relief at this port 47 with secondary relief through the cylinder and port 30. It is accordingly seen that there is possible herein primary and secondary relief and that there may be in connection with the relief valve a seepage control. There is further feature that even with this external relief adjustment, the container for the device has not an unsightly obstruction nor projection protruding therefrom inviting the novice to get a wrench or screw driver to see if he may tamper therewith to see if he may disturb the nicety of control for which the device is designed to operate.

What is claimed and it is desired to secure by Letters Patent is:

1. A rebound take-up device comprising a vessel having a cylinder therein, a piston in said cylinder as a movable partition between the cylinder chamber and the vessel chamber, there being port communication between said chambers including a stem extending away from said port, a ring shaped valve shiftable along said stem as a guide in providing an annular clearance about the valve toward the port, and a spring resisting shifting of the valve away from the port.

2. A rebound take-up device comprising a vessel having a cylinder therein, a piston in said cylinder as a movable partition between the cylinder chamber and the vessel chamber, there being port communication between said chambers including a stem extending away from said port, a ring shaped valve shiftable axially of and along said stem as a guide in providing an annular clearance about the valve toward the port, and an adjustable helical spring coaxial of the port and valve and resisting shifting of the valve away from the port.

3. A rebound take-up device comprising a vessel having a cylinder therein, a piston in said cylinder has a movable partition between the cylinder chamber and the vessel chamber, said piston having a head, a skirt therefrom, and a tubular extension from the head into the skirt, a ring shaped valve in the extension, a projection into the valve, and a spring positioning the valve about the projection, there being an opening to the valve from the cylinder and through the piston head, whereby valve shifting as to the projection and against said spring resistance permits flow from the cylinder chamber to the vessel chamber through the piston.

4. A rebound take-up device comprising a vessel having a cylinder therein, a piston in said cylinder as a movable partition between the cylinder chamber and the vessel chamber, said piston having a head, a skirt therefrom, and a tubular extension from the head into the skirt, a shouldered ring shaped valve in the extension, a bevel projection into the valve, and a spring positioning the valve about the projection, there being an opening to the valve from the cylinder and through the piston head, whereby valve shifting as to the projection and against said spring resistance permits flow from the cylinder chamber to the vessel chamber through the piston.

5. A rebound take-up device having a normal inflow passage and a reverse fluid flow relief comprising a structure embodying a port having ring shaped valve shiftable axially of and away from the port in providing an annular clearance about the valve toward the port, an adjustable helical spring coaxially of the port valve resisting shifting of the valve away from the port, and a bearing for the valve supporting the valve in valve shifting to port opening position.

6. A rebound take-up device comprising a vessel having a cylinder therein, a piston in said cylinder as a movable partition between the cylinder chamber and the vessel chamber, there being port communication through the cylinder between said chambers including a ring shaped valve shiftable axially of and away from the port in providing an annular clearance about the valve toward the port, a helical spring coaxially of the port valve resisting shifting of the valve away from the port, and a headed stem coacting as a guide for the valve and about which stem the spring is mounted, said stem extending to the vessel exterior and there adjustable for varying the operation of said valve.

7. A rebound take-up device comprising a vessel having a cylinder therein, a piston in said cylinder as a movable partition between the cylinder chamber and the vessel chamber, there being port communication through the cylinder between said chambers including a ring shaped valve shiftably axially of and away from the port in providing an annular clearance about the valve toward the port, a helical spring coaxially of the port valve resisting shifting of the valve away from the port, a headed stem coacting as a guide for the ring and about which stem the spring is mounted, said stem extending to the vessel exterior, said vessel having an opening providing a seat into which said stem is countersunk, packing in said seat over said stem, and a flush closure for the packing independently of which the spring is adjustable.

In witness whereof we affix our signatures.

ERNEST W. ACKERMAN.
GRIFFITH C. NICHOLSON.